US012767094B2

(12) United States Patent
BenSalem et al.

(10) Patent No.: US 12,767,094 B2
(45) Date of Patent: Oct. 20, 2026

(54) ELECTRONIC DEVICE PROTECTION SYSTEMS AND VEHICLES INCLUDING THE SAME

(71) Applicant: Toyota Motor Engineering & Manufacturing North America, Inc., Plano, TX (US)

(72) Inventors: Salem BenSalem, Ypsilanti, MI (US); Scott L. Frederick, Brighton, MI (US); Paxton S. Williams, Milan, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 356 days.

(21) Appl. No.: 18/384,169

(22) Filed: Oct. 26, 2023

(65) Prior Publication Data

US 2025/0136049 A1 May 1, 2025

(51) Int. Cl.
*B60R 99/00* (2009.01)

(52) U.S. Cl.
CPC ........... *B60R 99/00* (2013.01); *B60Y 2306/01* (2013.01)

(58) Field of Classification Search
None
See application file for complete search history.

(56) References Cited

U.S. PATENT DOCUMENTS 2,091,057 A 8/1937 Straith
5,078,422 A * 1/1992 Hamilton .............. B60R 21/272 280/736
5,988,675 A * 11/1999 Bathon ............... B60R 21/2171 280/743.1
6,816,760 B1 * 11/2004 Namaky ............. G06F 11/2733 701/33.2
11,084,447 B2 * 8/2021 Rupp .................... B60R 21/231
2005/0285430 A1 12/2005 Gerlach et al.
2014/0210231 A1 * 7/2014 Timmermann ..... B60R 16/0239 296/146.15

FOREIGN PATENT DOCUMENTS

CN 211571500 U 9/2020
CN 112677824 B 3/2022
CN 217865536 U 11/2022
KR 100509029 B1 8/2005

* cited by examiner

*Primary Examiner* — Aaron L Lembo
(74) *Attorney, Agent, or Firm* — Dinsmore & Shohl LLP

(57) ABSTRACT

A system for the protection of an electronic device in a vehicle includes a housing, a capsule, a trigger mechanism, and a supply of expandable material. The electronic device is positioned within the housing. The trigger mechanism is coupled to the capsule. The supply of expandable material is configured to move from a compressed state to an expanded state. The supply of expandable material is positioned within the capsule in the compressed state and positioned surrounding the electronic device within the bladder in the expanded state.

20 Claims, 3 Drawing Sheets

ELECTRONIC DEVICE PROTECTION SYSTEMS AND VEHICLES INCLUDING THE SAME

TECHNICAL FIELD

The present specification generally relates to systems of expandable material and, more specifically, electronic device protection systems having expandable material configured to protect electronic devices of vehicles.

BACKGROUND

Electronic devices have become integral to modern vehicles. The small, sensitive electronics monitor blind spots, conduct clearance sonar, and other critical functions in navigation, infotainment, vehicle diagnostics, and communications. However, the incorporation of these devices into vehicles expose the electronic devices to risks during accidents and collisions. The electronic devices may encounter additional risks during daily driving from dirty roads, rocks, rough terrain and the like. The potential for damage to the electronic devices can result in the loss of important data, impaired operations and compromised safety features. Replacing the electronic devices is expensive, time consuming, and not always possible.

Electronic devices are often installed in the vehicle during the assembly process in areas of the vehicle that are hard to reach. Further, during assembly, other parts are installed such that the area around the electronic device must be accessible. In such cases, the installation of adequate protective measures in hindered.

Accordingly, a need exists for alternative electronic device protection systems configured to protect electronic devices with expandable materials.

SUMMARY

In one embodiment, an electronic device protection configured to protect an electronic device in a vehicle may include a housing, a capsule, a trigger mechanism, and a supply of expandable material. The electronic device is positioned within the housing. The trigger mechanism is coupled to the capsule. The supply of expandable material is configured to move from a compressed state to an expanded state upon actuation of the trigger mechanism. The supply of expandable material is positioned within the capsule in the compressed state and positioned in the housing and surrounding the electronic device within the bladder in the expanded state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
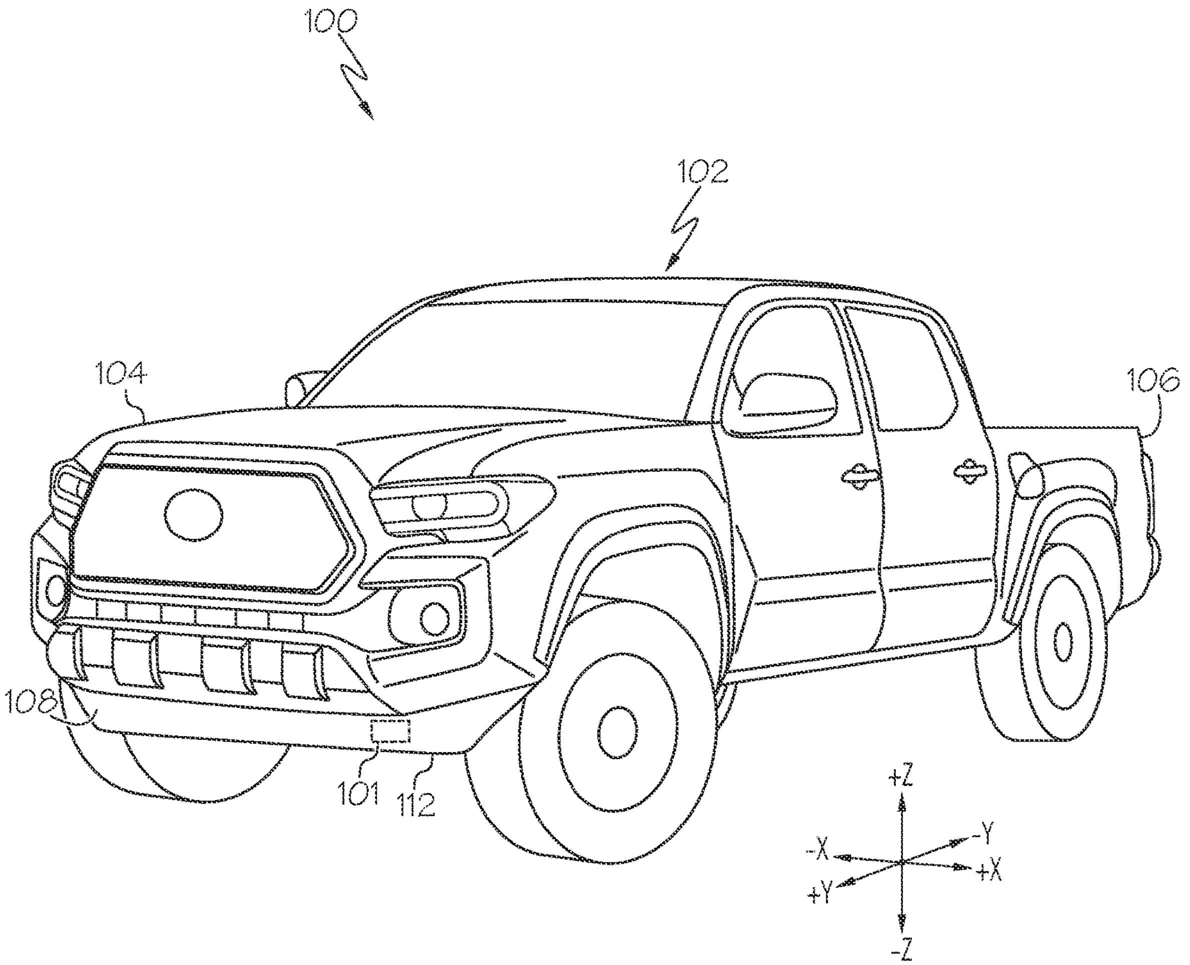
FIG. 1 schematically depicts a perspective view of a vehicle including a system for the protection of an electronic device, according to one or more embodiments shown and described herein.

Embodiments described herein are directed to an electronic device protection system configured to protect an electronic device in a vehicle that include a supply of expandable material configured to move from a compressed state to an expanded state, such that in the expanded state, the expandable material surrounds the electronic device. In the compressed state, the supply of expandable material is compressed within a capsule such that the capsule fits near or within the housing. As such, the electronic device may be assembled within the housing without disrupting the instillation of parts. After assembly into a vehicle, the capsule may be triggered manually or in response to a signal, activating into the expanded state. In such expanded state, the supply of expandable material acts to protect the electronic device from damage in the event of a crash, hit, or other damageable event.

The vehicles described herein include systems that include at least one or more electronic devices positioned within a housing, a bladder positioned within the housing, a capsule, a trigger mechanism coupled to the capsule, and a supply of expandable material configured to move from a compressed state to an expanded state upon actuation of the trigger mechanism, the supply of expandable material positioned within the capsule in the compressed state and positioned in the housing and surrounding the electronic device within the bladder in the expanded state. In embodiments, a processor is configured to actuate the trigger mechanism to cause the supply of expandable material to expand from the compressed state to the expanded state. The supply of expandable material may be CO2 or a spray polyurethane foam.

Various embodiments of the electronic device protection system configured to protect electronic devices in a vehicle are described in more detail herein. Whenever possible, the same reference numerals will be used throughout the drawings to refer to the same or like parts.

As used herein, the term "vehicle longitudinal direction" refers to the forward rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring to FIG. 1, a vehicle 100 is generally illustrated according to one or more embodiments described herein. As shown, the vehicle 100 is illustrated as a pickup truck. However, the vehicle 100 may be any suitable automobile including coupes, sedans, minivans, crossovers, hybrids, sports utility vehicles, or the like, in addition to other vehicles such as a bus, boat, or the like, without limiting the scope of the present disclosure.

Figure 2B:
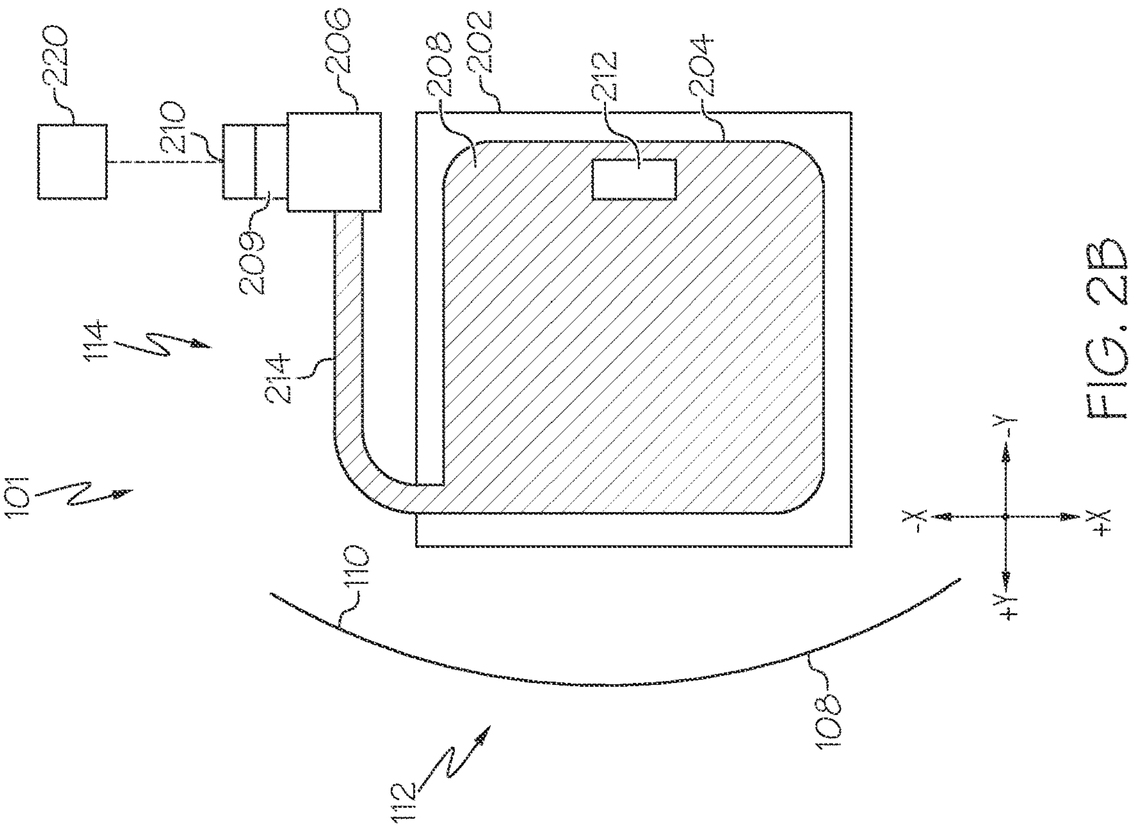
FIG. 2B schematically depicts a top view of the system for the protection of the electronic device in an expanded state including the duct connecting the capsule to the bladder positioned within the housing, according to one or more embodiments shown and described herein.

Referring to FIGS. 1 to 2B, the vehicle 100 includes a body 102 having a front end 104, a rear end 106 opposite the front end 104, a front bumper 112 having a front surface 108 and a rear surface 110 opposite the front surface 108, a cavity 114 is provided rearward of the rear surface 110 of the bumper 112 in the vehicle longitudinal direction and provided proximate the front end 104 of the body 102 of the vehicle 100.

The vehicle 100 includes the electronic device protection system 101 configured to protect an electronic device 212 assembled on the vehicle 100. For example, as depicted herein, the vehicle 100 includes the system 101 located within the cavity 114 of the front bumper 112 of the vehicle 100. However, it should be appreciated that the system 101 may be assembled at any location on the vehicle 100, including within the vehicle 100 or at a rear bumper located at the rear end 106. In addition, and number of systems 101 and electronic devices 212 may be assembled on the vehicle 100.

Now referring to FIGS. 2A-3B, a top view of the system 101 for the protection of the electronic device 212 is shown. As depicted, the system 101 includes a housing 202, a bladder 204, a capsule 206, a supply of expandable material 208, a trigger mechanism 209, a processor 210, an electronic device 212, and a sensor 220 connected to the processor 210. In some embodiments, a duct 214 connects the capsule 206 containing the supply of expandable material 208 to the bladder 204 positioned within the housing 202. The sensor 220 may be either wired or wirelessly connected to the processor 210.

The housing 202 is of a shape configured to hold the electronic device 212 for the purpose of the electronic device 212. In embodiments, the electronic device 212 may be a sensor, an electronic control unit, an airbag control unit, clearance sonars, blind spot monitors, and other circuits and sensors located within or attached to the vehicle 100. As a non-limiting example, the sensor 220 may be a rain and light sensor mounted within a hood of a vehicle and RADAR and LIDAR sensors mounted in the cavity 114 of the bumper 112. The electronic device 212 is positioned within the housing 202.

The bladder 204 is positioned within the housing 202. In embodiments, the electronic device 212 may be positioned within the bladder 204. In other embodiments, the electronic device 212 may be positioned between the bladder 204 and the housing 202. The bladder 204 is configured to expand from a deflated state (FIG. 3A) to an inflated state (FIG. 3B) upon the expansion of the supply of expandable material 208, as described below.

The supply of expandable material 208 may be air. In embodiments, the supply of expandable material 208 is $CO_2$. In other embodiments, the supply of expandable material 208 may be an expandable foam. For example, the expandable foam may be a polyurethane foam, such as a spray polyurethane foam. The capsule 206 contains the supply of expandable material 208 in the compressed state. In embodiments, the capsule 206 is housed within the bladder 204 positioned within the housing 202. The capsule 206 may be pressurized. In other embodiments, the capsule 206 may be coupled to the bladder 204 via a duct 214, the capsule 206 positioned outside the housing 202. The duct 214 is configured to allow the supply of expandable material 208 to travel to reach the bladder 204 as the supply of expandable material 208 expands from the compressed state to the expanded state.

A trigger mechanism 209 is coupled to the capsule 206. In embodiments, the trigger mechanism 209 is controlled by a processor 210. In embodiments, the trigger mechanism 209 is an actuator configured to trigger the release of the supply of expandable material 208 from the compressed state to the expanded state upon receipt of a signal from the processor 210.

In embodiments, the trigger mechanism 209 may be coupled to a frangible member of the capsule 206 so as to release the supply of expandable material 208 upon the actuation of the trigger mechanism 209. Specifically, in embodiments, the trigger mechanism 209, as an actuator, is controlled to fracture the frangible member of the capsule 206. In other embodiments, the trigger mechanism 209, as an actuator, may be positioned within the capsule 206 as to release the supply of expandable material 209 upon actuation of the trigger mechanism 209. In embodiments, the actuation of the trigger mechanism 209 may occur post assembly. In other embodiments, the actuation of the trigger mechanism 209 occurs upon detection or prediction of a collision by a sensor 220.

As non-limiting examples, the trigger mechanism 209 may be a string attached to a frangible member of the capsule 206. In such embodiments, the string may be actuated post assembly to protect the electronic device 212. In embodiments, the trigger mechanism 209 is an actuator having a firing pin actuated to puncture the capsule 206. In such embodiments, the actuator is actuated to move the firing pin post assembly or upon detection or prediction of a collision. In embodiments, the trigger mechanism 209 may be a squib or an inflator actuated by an electrical signal, wherein, upon the electrical signal, the squib detonates. However, it should be understood that the trigger mechanism 209 is not limited to the above actuators and any number of triggering mechanisms 209 may be used to trigger the release of the supply of expandable material 208 from the compressed state to the expanded state.

In embodiments in which the supply of expandable material 208 is air or $CO_2$, the trigger mechanism 209 may be a supply of water that is released, allowing a firing pin to puncture the capsule 206. The puncture of the capsule 206 fills the bladder 204 to provide protection to the electronic device 212. In embodiments in which the supply of expandable material 208 is a spray polyurethane foam, the trigger mechanism 209 triggers the release of two separate materials within the capsule 206, causing the reaction of the supply of expandable material 208 from the compressed state to the expanded state.

In embodiments, a processor 210 is coupled to a sensor 220 and the trigger mechanism 209. The processor 210 includes any processing components configured to receive and execute programming instructions. Accordingly, the processor 210 may be an electric controller, an integrated circuit, a microchip, a computer, or any other computing device. In some embodiments a sensor 220 may be in communication with the processor 210. The processor 210 is configured to actuate the trigger mechanism 209 to cause the supply of expandable material 208 to be released from the capsule 206.

Figure 2A:
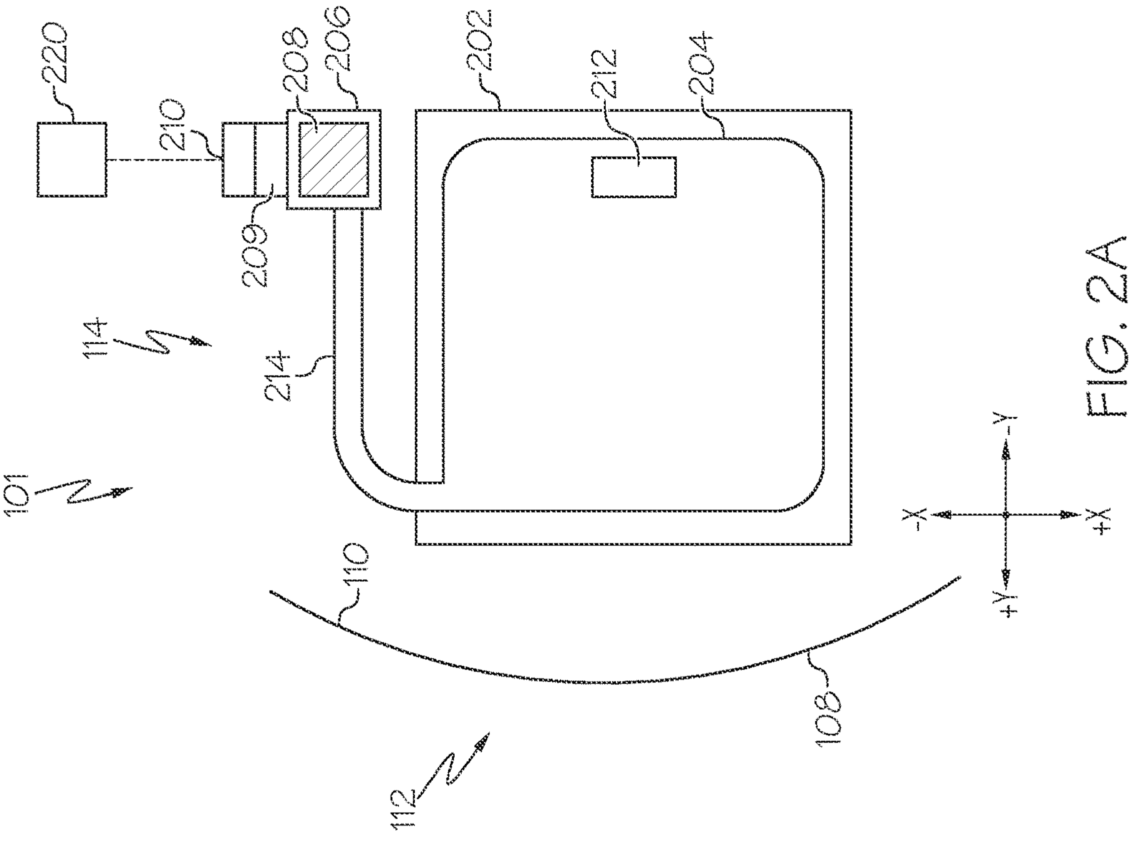
FIG. 2A schematically depicts a top view of the system for the protection of the electronic device in a compressed state including a duct connecting the capsule to a bladder positioned within a housing, according to one or more embodiments shown and described herein.

Now referring to FIG. 2A, the system 101 for the protection of the electronic device 212 in the compressed state, including the duct 214 connecting the capsule 206 to the bladder 204 in the deflated state, positioned within the housing 202, is depicted. In the compressed state, the supply of expandable material 208 is stored within the capsule 206. The bladder 204 is deflated within the housing 202.

Now referring to FIG. 2B, the system 101 for the protection of the electronic device 212 in the expanded state, including the duct 214 connecting the capsule 206 to the bladder 204 in the inflated state, positioned within the housing 202, is depicted. In the expanded state, the supply of expandable material 208 enters the bladder 204 to surround the electronic device 212 such that the bladder 204 is inflated. The trigger mechanism 209, as described above, is configured to trigger the capsule 206 to release the supply of expandable material 208 and cause the system 101 to move from the compressed state to the expanded state.

Figure 3B:
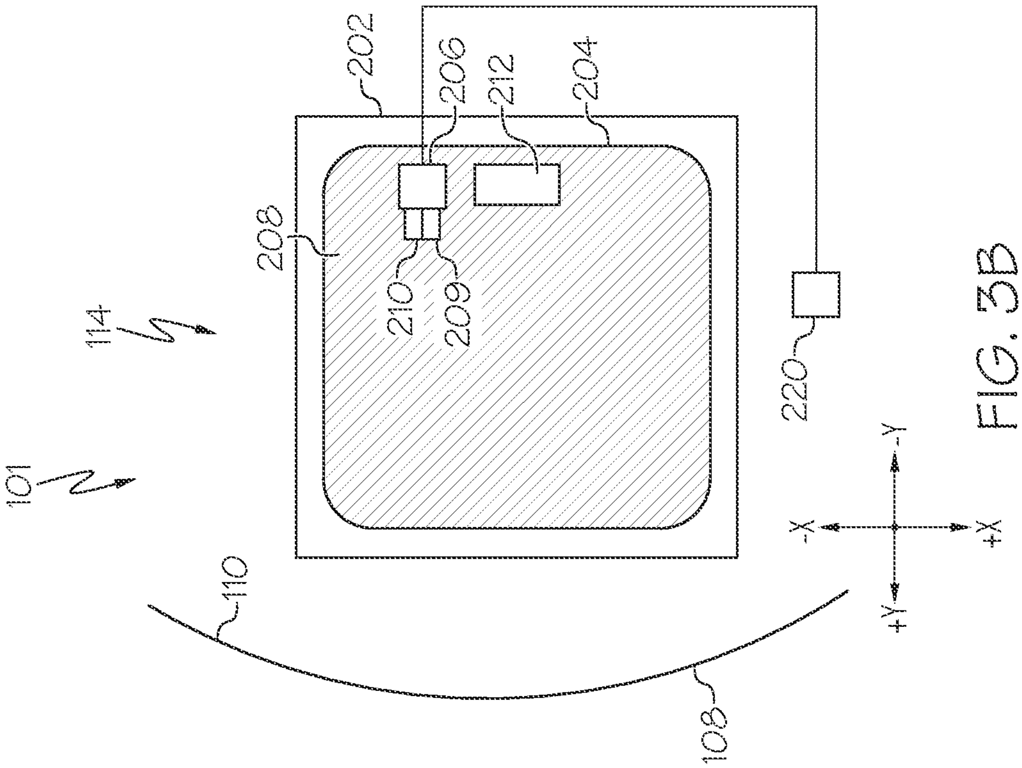
FIG. 3B schematically depicts a top view of the system for the protection of the electronic device in the expanded state including the capsule positioned within the bladder, according to one or more embodiments shown and described herein.
Figure 3A:
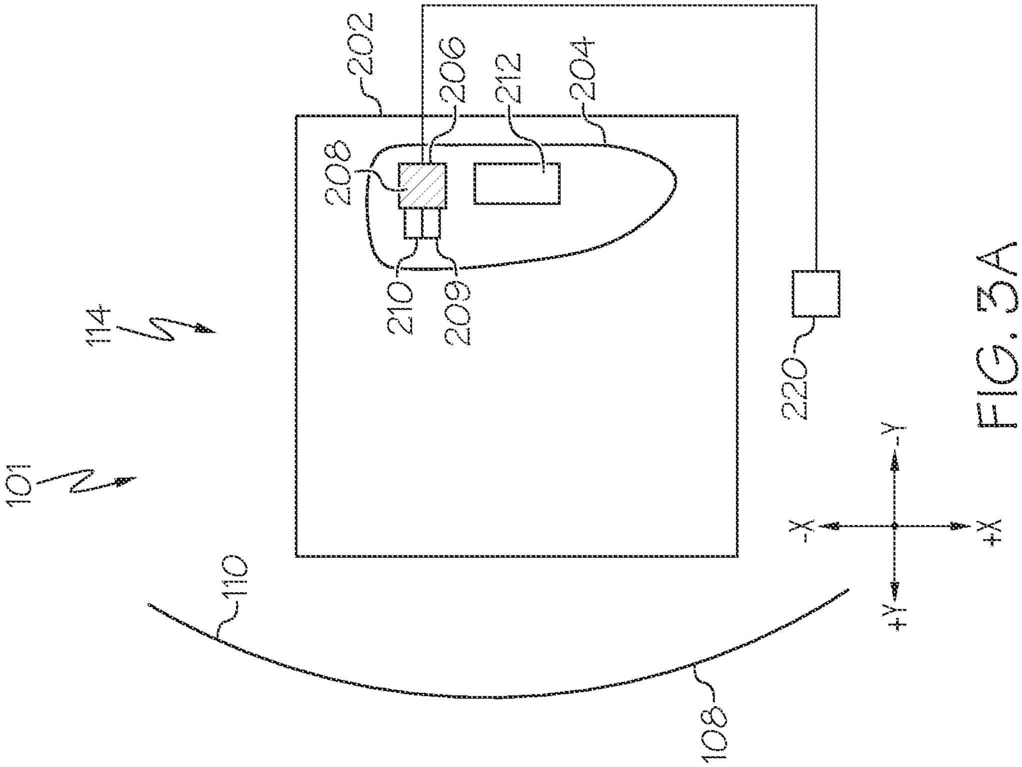
FIG. 3A schematically depicts a top view of the system for the protection of the electronic device in the compressed state including the capsule positioned within the bladder, according to one or more embodiments shown and described herein.

Now referring to FIG. 3A, the system 101 for the protection of the electronic device 212 in the compressed state, the capsule 206 positioned within the housing 202 and the bladder 204 in the deflated state, is depicted. In the compressed state, the supply of expandable material 208 is stored within the capsule 206. The bladder 204 is deflated within the housing 202.

Now referring to FIG. 2B, the system 101 for the protection of the electronic device 212 in the expanded state, the capsule 206 positioned within the housing 202 and the bladder 204 in the inflated state, is depicted. In the expanded state, the supply of expandable material 208 fills the bladder 204 to surround the electronic device 212. The bladder 204 is inflated. The trigger mechanism 209, as described above, is configured to trigger the capsule 206 to release the supply of expandable material 208 and cause the system 101 to move from the compressed state to the expanded state.

In embodiments, the processor 210 causes the trigger mechanism 209 to trigger the capsule 206 causing the release of the supply of expandable material 208. In some embodiments the processor 210 is configured to actuate the trigger mechanism 209 upon a signal from the sensor 220. In embodiments, the sensor 220 is configured to generate a signal upon a prediction or a detection of a collision. For example, the sensor 220 sends to the processor 210 a signal to trigger the capsule 206. The trigger mechanism 209 actuates, releasing the supply of expandable material 208. The supply of expandable material 208 expands into the expanded state from the compressed state. In embodiments, the supply of expandable material 208 travels through the duct 214 and into the bladder 204 causing the bladder 204 to move from the deflated state into the inflated state. The supply of expandable material 208 expands into the expanded state from the compressed state. The supply of expandable material 208 surrounds the electronic device 212 within the housing 202.

From the above, it is to be appreciated that defined here in is a vehicle with a system for the protection of electronic devices with an expandable material such that a trigger mechanism causes a supply of expandable material to expand from a compressed state to an expanded state from a position within a capsule to surround the electronic device within a housing. As such, the electronic device may be assembled within the housing without disrupting the instillation of parts and protection may be triggered post assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electronic device protection system configured to protect an electronic device in a vehicle, the system comprising:

a housing, the electronic device positioned within the housing;

a capsule;

a trigger mechanism coupled to the capsule; and a supply of expandable material configured to move from a compressed state to an expanded state upon actuation of the trigger mechanism, the supply of expandable material positioned within the capsule in the compressed state and positioned in the housing in the expanded state, the supply of expandable material surrounding and directly contacting the electronic device in the expanded state.

2. The system of claim 1, further comprising:

a processor configured to actuate the trigger mechanism to cause the supply of expandable material to expand from the compressed state to the expanded state.

3. The system of claim 2, further comprising:

a duct connecting the capsule to a bladder, wherein the processor is configured to release the supply of expandable material to travel through the duct to the bladder within the housing upon actuation of the trigger mechanism.

4. The system of claim 2, further comprising:

a sensor configured to communicate with the processor, wherein the processor is configured to actuate the trigger mechanism upon a signal from the sensor.

5. The system of claim 4, wherein the sensor is configured to generate the signal upon a prediction or a detection of a collision.

6. The system of claim 1, wherein a bladder is positioned within the housing and the capsule is positioned within the bladder and the housing.

7. The system of claim 6, wherein upon release of the expandable material, the bladder is inflated within the housing.

8. The system of claim 1, wherein the supply of expandable material is $CO_2$; and the capsule is a compressed $CO_2$ cylinder.

9. The system of claim 1, wherein the supply of expandable material is a spray polyurethane foam.

10. The system of claim 1, wherein the trigger mechanism is an actuator.

11. The system of claim 10, wherein the actuator is configured to rupture the capsule to release the expandable material.

12. The system of claim 1, wherein the trigger mechanism is a squib is configured to rupture the capsule to release the expandable material.

13. The system of claim 1, further comprising:

a bumper having an outside surface and an opposite inside surface, a cavity opposite the outside surface, wherein the housing is positioned within the cavity.

14. An electronic device protection system configured to protect an electronic device in a vehicle, the system comprising:

a housing, the electronic device positioned within the housing;

a capsule;

a trigger mechanism coupled to the capsule;

a supply of expandable material configured to move from a compressed state to an expanded state upon actuation of the trigger mechanism, the supply of expandable material positioned within the capsule in the compressed state and positioned in the housing and surrounding the electronic device in the expanded state; and a bladder positioned within the housing, the capsule positioned within the bladder and the housing.

15. The system of claim 14, wherein upon release of the expandable material, the bladder is inflated within the housing.

16. The system of claim 14, further comprising:

a processor configured to actuate the trigger mechanism to cause the supply of expandable material to expand from the compressed state to the expanded state.

17. The system of claim 14, further comprising:

a bumper having an outside surface and an opposite inside surface, a cavity opposite the outside surface, wherein the housing is positioned within the cavity.

18. An electronic device protection system configured to protect an electronic device in a vehicle, the system comprising:

a housing, the electronic device positioned within the housing;

a capsule;

a trigger mechanism coupled to the capsule; and a supply of expandable material configured to move from a compressed state to an expanded state upon actuation of the trigger mechanism, the supply of expandable material positioned within the capsule in the compressed state and positioned in the housing and surrounding the electronic device in the expanded state, the supply of expandable material being a spray polyurethane foam.

19. The system of claim 18, further comprising:

a processor configured to actuate the trigger mechanism to cause the supply of expandable material to expand from the compressed state to the expanded state.

20. The system of claim 18, further comprising:

a bumper having an outside surface and an opposite inside surface, a cavity opposite the outside surface, wherein the housing is positioned within the cavity.

* * * * *